(12) United States Patent
Betancur Ramirez et al.

(10) Patent No.: US 11,662,826 B2
(45) Date of Patent: May 30, 2023

(54) SYSTEM AND METHOD FOR INTERACTING WITH A MOBILE DEVICE USING A HEAD-UP DISPLAY

(71) Applicants: PONTIFICIA UNIVERSIDAD JAVERIANA, Bogota (CO); Jose Alejandro Betancur Ramirez, Bogota (CO)

(72) Inventors: Jose Alejandro Betancur Ramirez, Bogota (CO); Daniel Ricardo Suarez Venegas, Bogota (CO)

(73) Assignee: Pontificia Universidad Javeriana, Bogota (CO)

( * ) Notice: Subject to any disclaimer, the term of this patent is extended or adjusted under 35 U.S.C. 154(b) by 400 days.

(21) Appl. No.: 16/954,975

(22) PCT Filed: Dec. 19, 2018

(86) PCT No.: PCT/IB2018/060360
§ 371 (c)(1),
(2) Date: Jun. 17, 2020

(87) PCT Pub. No.: WO2019/123326
PCT Pub. Date: Jun. 27, 2019

(65) Prior Publication Data
US 2020/0310552 A1    Oct. 1, 2020

Related U.S. Application Data

(60) Provisional application No. 62/607,913, filed on Dec. 19, 2017.

(51) Int. Cl.
*G06F 3/01* (2006.01)
*B60K 35/00* (2006.01)
(Continued)

(52) U.S. Cl.
CPC .............. *G06F 3/017* (2013.01); *B60K 35/00* (2013.01); *G06F 3/014* (2013.01); *G06F 3/015* (2013.01);
(Continued)

(58) Field of Classification Search
CPC .......... G06F 3/017; G06F 3/014; G06F 3/015; G06F 3/016; G06F 3/167; G06V 40/28; B60K 35/00; G06T 7/20
See application file for complete search history.

(56) References Cited

U.S. PATENT DOCUMENTS

| 10,319,037 | B1* | 6/2019 | Chan | G06Q 40/08 |
| 2008/0048930 | A1* | 2/2008 | Breed | G02B 27/01 |
| | | | | 701/538 |

(Continued)

FOREIGN PATENT DOCUMENTS

| CN | 105759426 B | 7/2016 |
| CN | 106814807 A | 6/2017 |

*Primary Examiner* — David E Choi
(74) *Attorney, Agent, or Firm* — The Morales Law Firm; Joseph L. Morales, Esq.

(57) ABSTRACT

The invention relates to systems and methods for executing functions on a mobile device based on gestures and commands of a user inside a vehicle. The system comprises a head-up display that reflects the screen of a mobile device and a motion-detection device connected to the mobile device. The motion-detection device is configured to gather information on the movement of the user's fingers regardless of whether or not the user's hands are on the steering wheel of the vehicle. The mobile device is configured to classify the movement of the user's fingers in a predetermined gesture associated with a predefined instruction, based on which a function is executed on the mobile device.

20 Claims, 5 Drawing Sheets

(51) Int. Cl.
*G06F 3/16* (2006.01)
*G06T 7/20* (2017.01)
*G06V 40/20* (2022.01)

(52) U.S. Cl.
CPC .............. *G06F 3/016* (2013.01); *G06F 3/167* (2013.01); *G06T 7/20* (2013.01); *G06V 40/28* (2022.01); *B60K 2370/1529* (2019.05); *B60K 2370/31* (2019.05); *B60K 2370/573* (2019.05); *B60K 2370/589* (2019.05); *B60K 2370/67* (2019.05)

(56) References Cited

U.S. PATENT DOCUMENTS

| | | | |
|---|---|---|---|
| 2008/0136775 A1* | 6/2008 | Conant | G06F 3/014 345/156 |
| 2012/0225719 A1* | 9/2012 | Nowozin | G06F 3/017 463/36 |
| 2013/0293452 A1* | 11/2013 | Ricci | G06F 3/04847 345/156 |
| 2014/0156281 A1* | 6/2014 | Boyd | H04L 12/2818 704/275 |
| 2014/0240213 A1* | 8/2014 | Alaniz | G06F 3/017 345/156 |
| 2016/0320900 A1* | 11/2016 | Nabe | G06F 3/14 |
| 2018/0024695 A1* | 1/2018 | Iyer | G06F 3/0425 345/175 |
| 2018/0143686 A1* | 5/2018 | An | G06F 3/016 |
| 2018/0255335 A1* | 9/2018 | George | H04N 21/4532 |
| 2018/0364479 A1* | 12/2018 | Kwak | G02B 27/0149 |
| 2020/0094864 A1* | 3/2020 | Takahashi | G06F 3/0487 |
| 2020/0310552 A1* | 10/2020 | Betancur Ramirez | G06F 3/014 |
| 2022/0192596 A1* | 6/2022 | Fathieh | A61B 5/021 |

* cited by examiner

SYSTEM AND METHOD FOR INTERACTING WITH A MOBILE DEVICE USING A HEAD-UP DISPLAY

FIELD OF THE INVENTION

The present invention relates to systems and methods for controlling functions on a mobile device through interaction with a user with said mobile device through head-up displays inside vehicles.

BACKGROUND OF THE INVENTION

A head-up display (HUD) reduces dangerous distractions for the driver of a vehicle by displaying relevant information, such as vehicle speed and navigation information at a central point of the driver's field of vision, thus preventing the driver from taking their eyes off the road. A head-up display usually includes a transparent screen that displays useful data for the driver without requiring the driver to change the central point of their field of vision.

The influence of using head-up displays when driving has been widely discussed in different studies. Some studies confirm the advantages of the head-up displays in terms of mental workload (Gish & Staplin, 1995; Soomr & Urey, 2016), attention (Charissis et al., 2008; Tretten et al., 2011), safety (Kosaka et al., 2007), accident reduction (Lie & Wen, 2004), among other. As regards accident reduction, Liu & Wen conclude that the time a driver fixes his gaze on the head-up display should be less than two seconds in order to significantly reduce the risk of accidents. To avoid exceeding this time limit, an efficient interaction method and friendly display are important requirements for the effective implementation of a head-up display in a vehicle.

Currently, the head-up displays designed for a specific vehicle brand or model have limited functionality that cannot be modified. Moreover, these systems cannot be easily adapted to older vehicles or they are only available for a limited range of vehicles.

On the other hand, mobile devices are widely used, but they are not designed, and in many cases are even prohibited, to be handled while driving. However, it is common for users to use mobile devices while driving, which ends in fatal accidents that could be prevented. Therefore, head-up displays are commonly used to project information from the screen of mobile devices and thus display this information safely while driving.

However, current head-up displays do not integrate all the functions of mobile devices, but only vehicle control options such as light or air conditioning control options, which is not enough for many people.

Furthermore, despite the fact that current mobile devices, such as smartphones or tablets, correspond to devices with high processing power and versatility, the head-up displays that are currently implemented through mobile devices have fixed interfaces and very few customization options. There are also no interaction methods with a wide range of interaction options and where driver safety is taken into account.

Thus, there is a need for a system that adapts to any vehicle, a system that is quick, easy, portable, customizable and easy to use through the integration of mobile applications in a single interface, which allows control of its functionalities through different safe and fast interaction methods. Moreover, in order for this system to be safe and viable, it must require the shortest possible time to perform the desired function, generate the least number of distractions and have a high degree of acceptance among drivers.

BRIEF DESCRIPTION OF THE INVENTION

The present invention relates to systems for executing functions on a mobile device based in gestures and commands of a driver inside a vehicle, the system comprising a head-up display that reflects the screen of the mobile device to display an interface present on the screen of the mobile device and a motion-detection device connected to the mobile device.

The motion-detection device is configured to gather information on the drivers finger movement when the driver does or does not have his hands on the steering wheel of the vehicle, and the mobile device is configured to classify the movement of the user's fingers into a predetermined gesture associated with a function, based on the information gathered by the motion-detection device. The mobile device is configured to execute a function on the mobile device based on the associated finger gesture.

Another aspect of the invention relates to methods for executing functions on a mobile device based on the gestures of a driver inside a vehicle, including the steps of: capturing information on the movement of the driver's fingers using a motion-detection device; transmitting the captured information to a mobile device; determining the probability that the driver has made a finger movement corresponding to a predetermined gesture; classifying the movement from the user's fingers into a predetermined gesture based on the determined probability; and execute on the mobile device a function corresponding to the gesture in which the movement from the driver's fingers was classified. The mobile device functions are displayed in an interface by means of a head-up display implemented by means of the mobile device's screen.

DETAILED DESCRIPTION OF THE INVENTION

The present invention refers to systems and methods for controlling functions from a mobile device 16 and through interaction with a driver 15 of a vehicle with said mobile device 16 through a head-up display. The main function of the system disclosed herein is to enable a vehicle driver 15 to see notifications and to interact with selected applications of the mobile device 16 in a comfortable and safe manner while driving. The present invention allows executing functions on the mobile device 16 using different interaction methods without requiring the driver 15 to take their hands of the wheel 10 of the vehicle or their eyes off the road, thus reducing the number of distractions and increasing safety while driving.

Throughout this document, the term "vehicle" shall be understood to mean any type of motor vehicle, including but not limited to internal-combustion engine vehicles, electric vehicles, human-powered vehicles, hydrogen vehicles, solar vehicles, or vehicles using alternative energy for propulsion. Similarly, the term "application" refers to the functionalities that any mobile device 16 can have by default or additional download. The present invention allows an integration of specific applications regardless of the brand or model of the mobile device.

Figure 1:
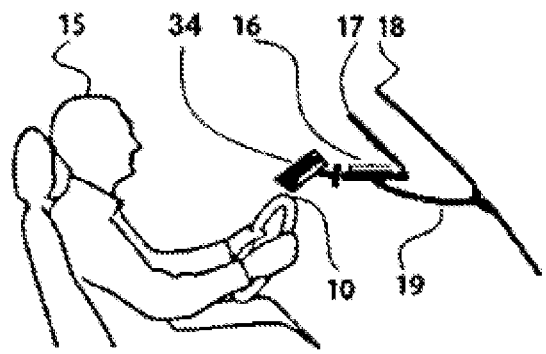
FIG. 1 shows a side view of the system's arrangement according to an embodiment of the present invention.

An aspect of the present invention relates to a system for executing functions 31 on a mobile device 16 based on the gestures and commands of a driver 15 inside a vehicle, where the system comprises a head-up display that reflects the screen of mobile device 16 and allows viewing an interface 30 present on the screen of mobile device 16. The system further includes at least one motion-detection device 33, 34 that communicates with the mobile device 16. FIG. 1 shows an arrangement of elements of the present invention according to a preferred embodiment wherein a driver 15 with his hands on the steering wheel 10 observes a reflection of the screen of the mobile device 16 in a combiner 17 which is attached to a windshield 18 by means of a support 19.

According to the system disclosed herein, the at least one motion-detection device 33,34 is configured to gather information on the driver's 15 finger 8 movement when the driver does or does not have their hands on the steering wheel 10 of the vehicle and the mobile device 16 is configured to, based on the information gathered by the at least one motion-detection device 33,34, classify the movement of the driver's 15 fingers into a predetermined gesture 35 associated with a predefined function 31, based on the information gathered by the motion-detection device 33,34. The mobile device 16 is configured to execute a function 31 on the mobile device 16 based on the finger gesture 35.

The motion-detection device 33, 34 of the system disclosed herein is any type of device that allows detecting and capturing movement. Preferably, the motion-detection device 33, 34 according to the present invention is selected from the group comprising: hand accessories with sensors, image detection devices, tracking systems with finger markers, infrared systems and electromyography signal measurement systems.

Figure 2:
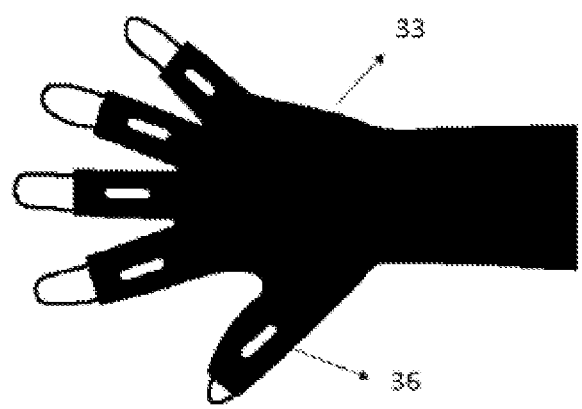
FIG. 2 shows an overview of the system's head-up display according to an embodiment of the present invention.

According to a preferred embodiment, the motion-detection device is a hand accessory 33 with sensors 36, such as a glove with flex sensors, as shown in FIG. 2. Preferably, the glove comprises optical flex sensors. The flex sensors that are part of the glove can be arranged in one or more regions of the user's fingers and in one or more regions between the user's fingers. The distribution of the sensors allows full measurement of the movements of the driver's 15 fingers. According to a preferred embodiment, the glove comprises a sensor on each finger. In another embodiment, the glove comprises at least one actuator that generates haptic feedback when a function is performed 31.

In another embodiment of the invention, the motion-detection device is an image detection device 34, preferably a digital video camera. The digital camera disclosed herein is arranged such that it focuses on the driver's 15 fingers, regardless of whether or not they are on the steering wheel 10 of the vehicle. According to another embodiment, the digital camera is arranged to focus on the regions of the steering wheel 10, the dashboard of the vehicle, the center console of the vehicle, and the gear stick of the vehicle. Preferably, the digital camera disclosed herein is arranged such that it focuses the driver's 15 fingers, regardless whether they are on the steering wheel 10 of the vehicle.

Preferably, the motion-detection device of the system disclosed herein comprises an image detection device 34 and a hand accessory with sensors 33. In a preferred embodiment, the driver 15 can choose to use the image detection device 34 or the hand accessory with sensors 33. In another embodiment, the image detection device 34 and the hand accessory with sensors 33 work together to detect finger gestures 8. Using both elements allows the system to eliminate undesired gesture errors, for instance, when the user is handling the gear stick or while changing the vehicle controls in the center console. In such cases, the finger gestures 8 detected in the hand accessory with sensors 33 can be corroborated by the image detection device 34 and verify more effectively if the gesture is a desired and valid gesture.

In an embodiment, the motion-detection device 34 corresponds to one or more cameras integrated in the mobile device 16. In an embodiment, the mobile device 16 camera can detect movement from the driver's fingers through its reflection in the high-reflectivity combiner 17. In another preferred embodiment, an additional lens is placed in the camera of the mobile device 16 that changes the focus towards the desired region.

In another embodiment of the invention, the image detection device 34 is complemented by a system of markers arranged in the driver's hand by means of a hand accessory. The markers allow reducing the noise from the detected signal to improve processing speed and detection accuracy.

According to another embodiment of the invention, the motion-detection device 33, 34 can be a system comprising an infrared signal emitter and an infrared signal detector. The infrared signal emitter emits a dot matrix on the desired region, and the infrared signal detector detects the deformation of the dots to calculate the location of the objects within the desired region. The infrared signal emitter and detector can be a Kinect® system.

According to another embodiment of the present invention, the motion-detection device is a detector of electromyographic signals of the driver's 15 hand. The electromyographic signals correspond to the muscular activation of each finger. In an embodiment, the system disclosed herein includes a hand accessory for the user comprising electrodes for detecting the electromyographic signals of each finger. In another embodiment, the system comprises an accessory for the user's forearm, comprising electrodes for detecting the electromyographic signals of each finger.

In an embodiment, the motion-detection device 33, 34 comprises a wireless communication module that allows receiving and sending information to the mobile device 16 without requiring a wired connection. Thus, a greater adaptability of the system is obtained that allows placing the motion-detection device in an optimal location without negatively affecting the movements of the driver 15 while driving. In a preferred embodiment, the wireless communications module is a bluetooth module.

A characteristic of the present invention is that the system disclosed herein further comprises a head-up display that reflects a virtual image 6 of the screen of the mobile device 16 and allows visualizing the interface 30 present on the screen of the mobile device 16.

According to the present invention, the head-up display comprises a head-up display holder 19 that supports a mobile device holder 13 where the mobile device 16 is placed. The mobile device's holder is attached to a high-reflectivity combiner 17 where the light from the mobile device's 16 screen is reflected to generate the virtual image 6.

Figure 3:
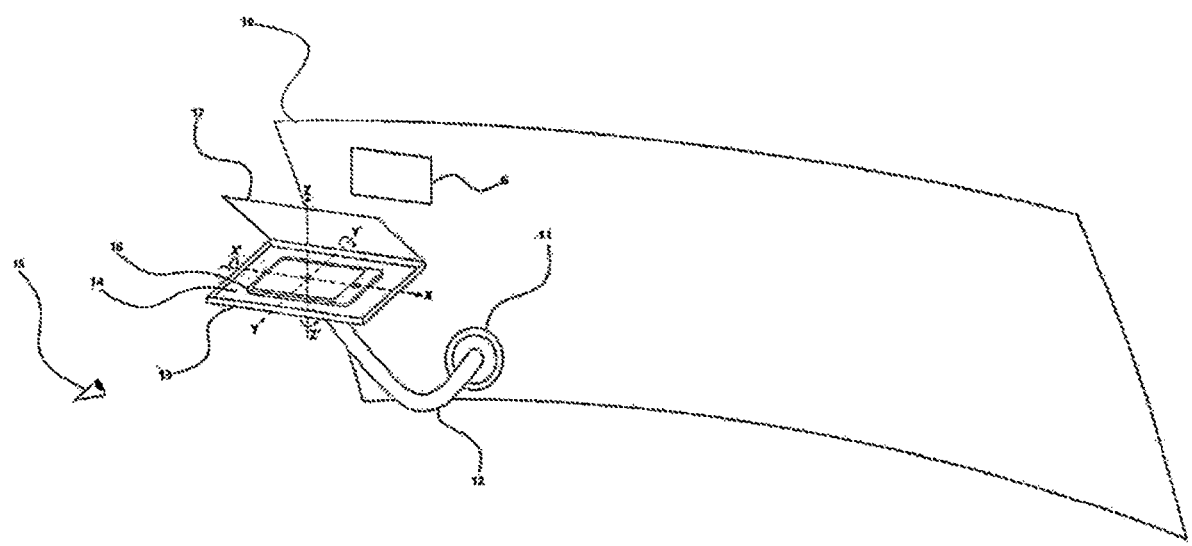
FIG. 3 shows a rear view of the system's head-up display according to an embodiment of the present invention.

FIG. 3 shows a head-up display that is part of the system according to a preferred embodiment of the present invention. The head-up display comprises a high-reflectivity combiner 17, attached to a head-up display holder 19 on which a mobile device 16 is placed, so that the screen of the mobile device 16 generates a virtual image 6. The head-up display is attached to a windshield of the vehicle 18 through fastening means, preferably through a suction cup 11. The system is arranged such that the driver 15 watches the road through virtual image 6 generated by the head-up display.

FIG. 3 shows an embodiment of the system's architecture. The head-up display holder 19 is connected to the windshield 18 by means of a suction cup 11, the mobile device 16 being placed on a surface 14 of the mobile device holder 13. In a preferred embodiment, the surface 14 is characterized by being covered with a non-slip layer that prevents the mobile device from changing positions or vibrating with the vehicle's movements.

When the mobile device 16 is placed on the mobile device holder 13, the virtual image 6 is generated by the reflection of light from the screen of the mobile device 16 in the high-reflectivity combiner 17.

The position and orientation of the virtual image 6 can be modified by changing the position of a linkage arm 12, which changes the location of the holder 13 and, consequently, the location of the surface 14 where the mobile device 16 is located. In an embodiment, the head-up display comprises, as linkage arm 12, a flexible hose that allows adapting the head-up display to the desired position in any vehicle. In a preferred embodiment, the length of the flexible hose 12 is such that it allows the device 16 and the projected virtual image 6 to move along the X, Y and Z axes and to rotate around the X', Y' and Z' axes in any direction.

In another embodiment, the head-up display holder 19 is placed on the vehicle's dashboard. The mobile device 16 is placed on a surface 14 of the holder 13, attached to the high-reflectivity combiner 17. The position of the virtual image 6 can be modified by changing the height of the head-up display holder 19 depending on the preferences of the driver 15. In another embodiment, the head-up display 19 can be attached to the handlebar of a two or three-wheeled vehicle.

Figure 4:
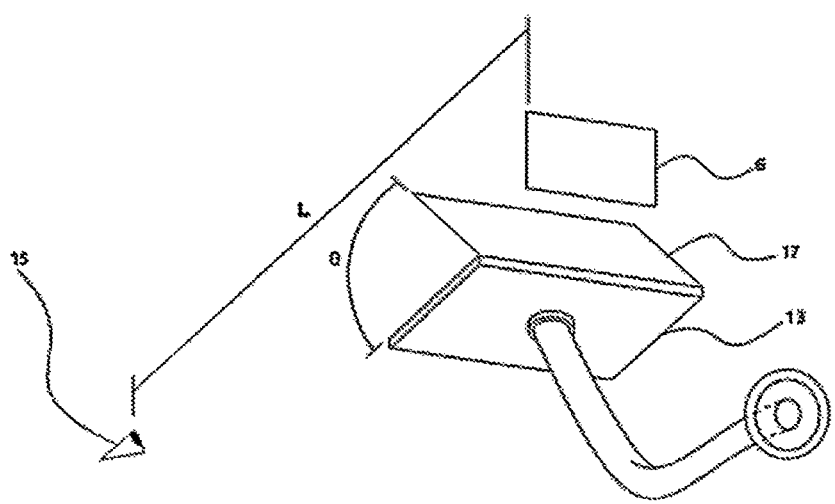
FIG. 4 shows a preferred embodiment of the motion-detection device when it is hand accessory with sensors.

FIG. 4 is another view of the head-up display's structure, wherein the distance L corresponds to a distance between the driver 15 and the virtual image 6. In an embodiment, the angle θ between the high-reflectivity combiner 17 and the mobile device holder 13 can be set between 0° and 360° by modifying the position of the holder 13 and the high-reflectivity combiner 17. In another embodiment, the angle θ between the high-reflectivity combiner 17 and the mobile device holder 13 can be set to 45°. In another embodiment, the high-reflectivity combiner 17 is substantially flat and virtual image magnification 6 and image aberration is approximately 0.

In an embodiment, the high-reflectivity combiner 17 is composed of a material selected from transparent polymeric materials or glass. Preferably, the material that makes up the high-reflectivity combiner 17 is poly(methyl methacrylate) (PMMA).

In an embodiment, the high-reflectivity combiner 17 is configured to fit on the mobile device holder 13 to remove the virtual image 6 entirely when you do not want to use the head-up display. In this embodiment, the driver 15 can then view the interface 30 directly on the screen of mobile device 16 while continuing to interact with the mobile device through the present invention's system.

In another embodiment, the holder 13 and the combiner 17 are configured to disengage from the holder 19 of the head-up display. In this embodiment, the mobile device holder 13 and the combiner 17 become a protective case for the mobile device 16 that the driver 15 can remove from the vehicle but which can be easily installed when they return to the vehicle.

According to the present invention, the mobile device 16 is configured to implement a classification algorithm with which the probability that the movement of the driver's 15 fingers 8 corresponds to a predefined gesture is calculated. According to the preferred embodiments of the invention, the classification algorithm uses binomial, multinomial logistic regressions or combinations thereof. Binomial logistic regressions are an effective method to carry out an effective classification in non-predefined gestures of the movement of the fingers. According to another embodiment, the mobile device 16 is configured to classify the driver's finger gesture 15 using multinomial logistic regressions, which generate an effective classification for predefined gestures. In another preferred embodiment, a classification by combining binomial and multinomial logistic regressions allows the effective classification of predefined gestures and non-predefined gestures.

Logistic regression methods allow partial gesture classification, meaning that the driver 15 does not have to extend his fingers completely for the system to correctly classify the gesture made. Moreover, logistic regression methods are fast, which allows quick interaction between the driver 15 and the interface 30, and they consume few processing resources, allowing them to be implemented in any mobile device 16.

The present invention is characterized in that the driver 15 can control the functions of the mobile device 16 while driving without needing to take their hands off the steering wheel 10. Thus, the information shown in virtual image 6 changes as the driver 15 uses the system disclosed herein.

Figure 5:
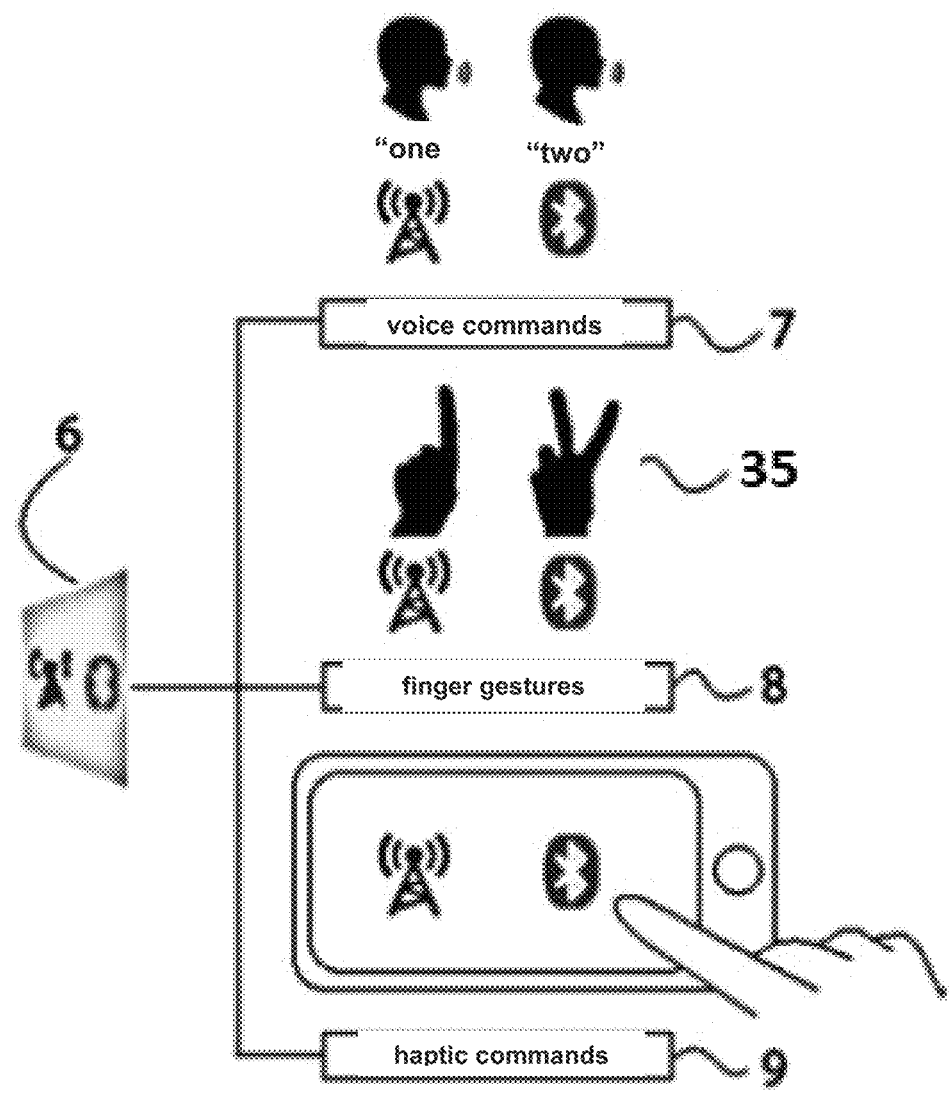
FIG. 5 shows the methods of user interaction with the system according to an embodiment of the present invention.

The ways in which the driver 15 can interact with the system are: haptic commands 9, voice commands 7 and/or finger gestures 8 as shown in FIG. 5. The driver 15 can enable or disable the forms of interaction depending on their personal preferences.

To cut down on the time the driver must spend fixing their sight on the head-up display, the present invention implements a simple interface 30 for interaction between the driver 15 and the system.

When haptic interaction 9 is used, the driver 15 can touch the screen of the mobile device 16 and access the functions 31 that are projected on the virtual image 6.

When voice command interaction 7 is used, the driver can say keywords corresponding to specific functions 31, which are executed on the mobile device 6 and which are projected on the interface 30. According to a preferred embodiment, the keywords are numbers "one" to "five".

Finally, when gesture interaction 7 is used, the driver 15 may make a finger gesture 8 to choose from a plurality of options displayed on the interface 30. Preferably, the plurality of options is equivalent to options 1 to 5.

The interface 30 is configured so that the driver 15 can navigate through different functions 31 of the mobile device.

According to a preferred embodiment, the interface 30 implements a tree structure with one or more levels. The functions 31 at each level may correspond to selecting a function of the mobile device 16 or going to a new level within the tree. According to the present invention, the tree consists of n levels and each level implements up to m functions 31.

According to a preferred embodiment, the tree is made up of n=3 levels. Preferably, each level includes m=5 instructions. More preferably, the functions 31 of the first two levels allow going down to the next level, while the functions 31 of the third level allow the execution of the mobile device 16 functions. Thus, with only five options the user can access up to 125 functions 31 on the mobile device.

Figure 6:
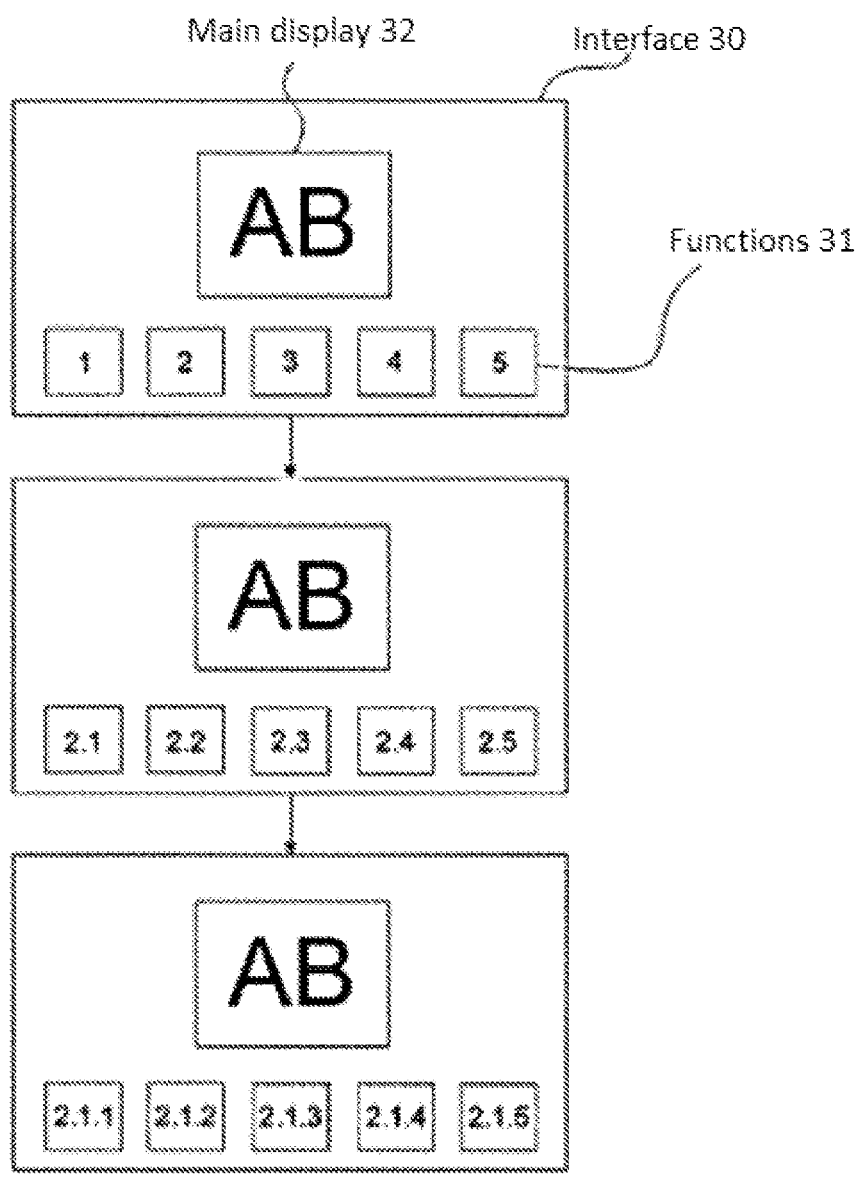
FIG. 6 shows an embodiment of the interface and the system functions according to an embodiment of the present invention.

FIG. 6 corresponds to a preferred embodiment of the interface 30 of the system. The interface 30 is generated by a mobile application installed on the mobile device 16. The interface 30 is implemented by means of a plurality of interfaces having a decision tree structure with a main display 32 in a central location.

According to another embodiment, the interface 30 integrates functions of any mobile application installed on the mobile device 16. Preferably, the driver 15 can customize the interface 30 with their preferred applications and select the desired functions.

According to preferred embodiments, the applications that can be integrated with the interface correspond to radio, music, geo-navigation, calls and instant messaging applications.

Preferably, each voice command 7 and each haptic command 9 corresponds to one and only one of the finger gestures 8. As such, the driver 15 does not need to learn complex voice commands to use the present invention since they need only learn a single way to navigate the functions 31 of the interface 30. This embodiment reduces the number of distractions affecting the driver 15 and reduces the training time required to use the system correctly.

According to the invention, the language of the voice commands 7 can be modified depending on the geographical location of the driver 15.

The finger gestures 8 that can be performed by the driver 15 can be defined depending on the cultural factors or the shape of the steering wheel 10. In other words, the finger gestures 8 detected by the system can be reconfigured by the driver 15 to adapt to physical or cultural conditions. Depending on the geographical location, it is customary to lift different fingers to indicate the same number. For instance, in some countries, number "one" is indicated by raising the thumb while in others it is indicated by raising the index finger. Furthermore, the shape of the vehicle's steering wheel 10 may vary and optimal gestures can be selected in order to increase the driver's comfort to perform them. In one embodiment, the finger gestures are performed by at least one finger of the hand of a driver 15. In another embodiment, the gestures are made by the driver's 15 both hands.

Figure 7:
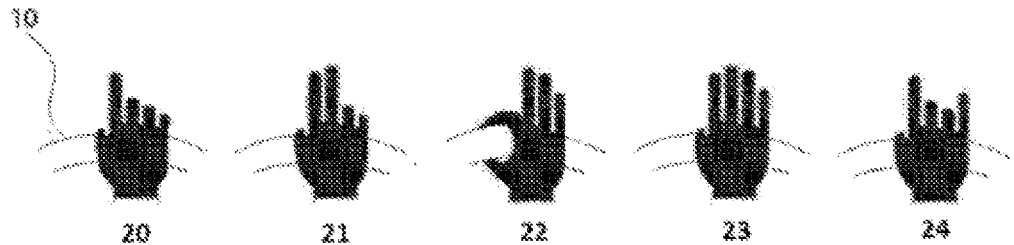
FIG. 7 shows examples of default finger gestures according to an embodiment of the present invention.

FIG. 7 shows one modality of the finger gestures 8 with which the driver can select the functions 31 of the interface 30. The gestures of the modality 20, 21, 22, 23, 24 can be made without taking your hands off the steering wheel 10 and without taking your eyes off the road while driving. In another embodiment, the gestures can also be performed when the hands are not on the steering wheel 10, for example, when the hand is on the gear stick.

A second aspect of the invention relates to a method for executing functions on mobile devices based on the gestures of a driver within a vehicle, including the steps of: capturing information 25 from the movement of the driver's 15 fingers; transmitting the information 26 to a mobile device 16; establishing the probability 27 that the movement of the user's fingers is one of the predetermined gestures 35; classifying 28 the movement in one of the predetermined gestures 35; and executing 29 on the mobile device 16 a function 31 corresponding to the gesture made by the driver 15. The functions 31 of the mobile device 16 are displayed by means of a head-up display implemented by means of the screen of the mobile device 16.

According to the present invention, the information on the driver's 15 fingers is captured by means of the motion-detection device 33, 34. The motion-detection device 33, 34 is related to any type of device that allows detecting and capturing movement. Preferably, the motion-detection device 33, 34 according to the present invention is selected from the group comprising: hand accessories with sensors, image detection devices, tracking systems with spherical finger markers, infrared systems and electromyography signal measurement systems.

According to an embodiment of the present invention, the motion-detection device 33, 34 transmits the information of the driver's 15 finger movements to the mobile device 16. Preferably, the motion-detection device communicates wirelessly with the mobile device 16. In a preferred embodiment, communication between the motion-detection device 33, 34 and the mobile device 16 is done by means of a bluetooth protocol.

According to an embodiment, after receiving the information of the driver's 15 fingers movement, the mobile device 16 conducts a filtering of the signal. In a preferred embodiment, a normalization of the signal is performed.

According to the present invention, a determination is made of the driver's 15 gesture. According to an embodiment, the probability that the driver 15 has performed a predetermined gesture 35 is determined using a classification of probability. For this purpose, a value is defined of the probability of extension of each of the driver's 15 fingers and then the gesture performed by driver 15 is classified into one of the predetermined gestures 35 using the values.

According to an embodiment of the present invention, to define the probability value of the extension of each finger of the driver 15, an algorithm for classifying binomial, multinomial logistic regressions or combinations thereof is used. According to an embodiment, the value of probability of the extension of each finger of the driver 15 is defined using multinomial logistic regressions. According to an embodiment, the value of probability is defined using binomial logistic regressions. In another preferred embodiment, a classification is used by combining binomial and multinomial logistic regressions.

According to the invention, after classifying the gesture made by the driver 15, a function 31 corresponding to the gesture is executed on the mobile device 16. The mobile device 16 functions 31 are displayed in an interface 30 generated through a head-up display implemented by means of the mobile device's 16 screen.

The interface 30 is configured so that the driver 15 can navigate through different functions 31 of the mobile device. According to a preferred embodiment, the interface 30 implements a tree structure with one or more levels. The functions 31 at each level may correspond to selecting a function of the mobile device 16 or going to a new level within the tree.

According to an embodiment of the method of the present invention, the interface 30 is perceived by a driver 15 through a head-up display, which comprises a head-up display holder 19 that supports a mobile device holder 13 where the mobile device 16 is placed. The mobile device's holder is attached to a high-reflectivity combiner 17 where the light from the mobile device's 16 screen is reflected to generate the virtual image 6.

Figure 8:
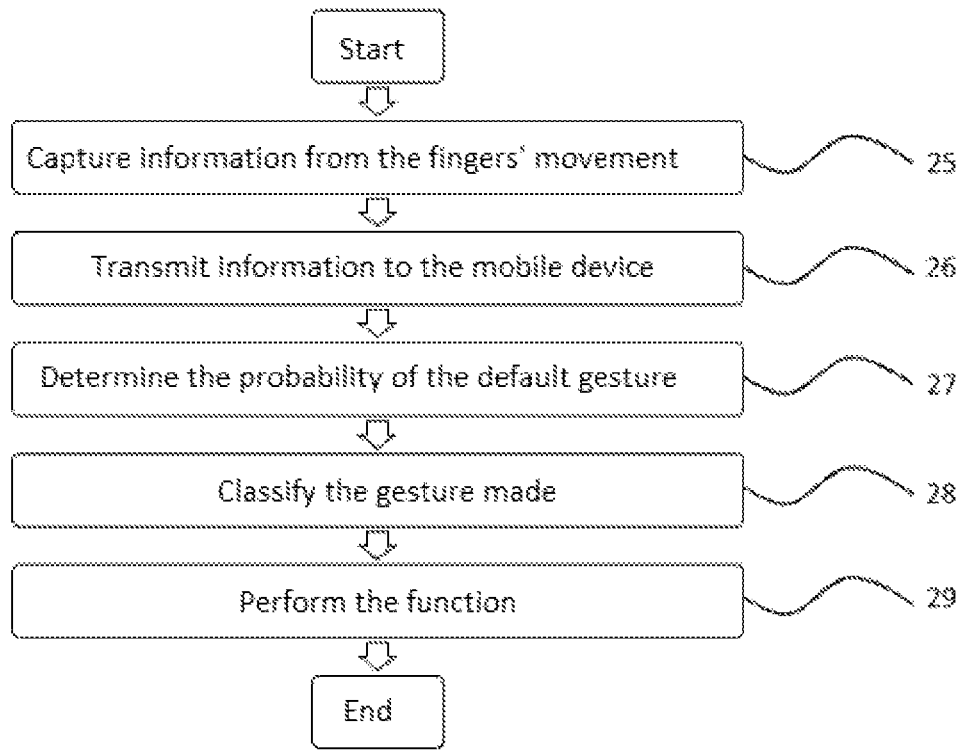
FIG. 8 shows a flow chart of the finger gesture classification method according to an embodiment of the present invention.

FIG. 8 shows a flow chart of an embodiment of the method to execute functions on mobile devices based on the gestures of a driver 15 inside a vehicle, including the steps of: capturing information 25 from the movement of the drivers 15 fingers through a motion-detection device 33, 34; transmitting 26 the information to a mobile device 16; determining 27 the probability that the driver 15 has made a gesture 35 corresponding to a predetermined classification based on the information of the fingers' movements; classifying 28 the movement from the driver's 15 fingers into a predetermined gesture 35 based on the determined probability; and executing 29 on the mobile device 16 a function 31 corresponding to the gesture in which the movement of the middle fingers of a head-up display implemented though the screen of the mobile device 16 was classified.

The embodiments disclosed herein exemplify the invention, which is not limited to such embodiments, and its scope may include obvious variations and modifications of said embodiments.

Example 1

During the use of the system of the present invention, the interface 30 allows viewing and manipulating information from different radio applications 1, viewing and manipulating information from music applications 2, viewing and replying to instant messages with voice memos from an instant messaging application 3, viewing and answering or rejecting a call 4, and viewing geolocation information from a navigation application 5. The interface of the system 30 changes according to the selected function to reduce the number of potential distractions seen by driver 15.

In an embodiment shown in FIG. 6, the interface may contain the following options: Radio app 1, Go to the next radio station 1-1, Go to the previous radio station 1-2, Change to the preset radio station 1-3, Change preselection to next station 1-3-1, Change preselection to previous radio station 1-3-2, Go back to previous radio menu 1-3-5, Bookmark station 1-4, Go back to previous menu 1-5. Music player app 2, Next playlist 2-1, Jump back to previous playlist 2-2, Choose playlist 2-3, Jump back to previous song 2-3-1, Skip to next song 2-3-2, Pause/Play song 2-3-3, Go back to previous music menu 2-3-5, Go back to previous menu 2-5. Instant messaging app 3, Move up in contact list 3-1, Move down in contact list 3-2, Choose a contact 3-3, Scroll up in chat 3-3-1, Scroll down in chat 3-3-2, Activate microphone for 30 seconds to send a voice memo 3-3-3, Go back to previous messaging menu 3-3-5, Go back to previous menu 3-5. Phone app 4, Answer incoming call 4-1, Reject incoming call 4-2, Go back to previous menu 4-5. Navigation app 5, Select destination "Home" 5-1, Select destination "Work" 5-2, Select address 5-3, or Go back to previous menu 5-5.

In the same example, if the driver 15 wants to select function 3-1 (Move up in contact list), the driver 15 can make the finger gesture equivalent to number "three" and then the finger gesture equivalent to number "one". In another embodiment, the driver says number "three" and then touches number "one" of the interface 30 to activate that same function 3-1. Overall, any combination of gestures, voice commands, and haptic commands corresponding to the 3-1 sequence of functions will achieve the same effect.

For instance, as previously described, saying number "three," touching option "three," or making the finger gesture corresponding to option "three" have the same effect.

The invention claimed is:

1. System for executing functions in a mobile device based on the gestures of the driver of a vehicle, the system comprising:
    a head-up display that reflects a virtual image of the screen of the mobile device and allows visualizing an interface present on the screen of the mobile device; and
    at least one motion-detection device connected to the mobile device;
wherein:
    the at least one motion-detection device is configured to gather information on the driver's fingers' movement regardless of whether or not their hands are on the steering wheel of a vehicle
    the mobile device is configured to, based on the information gathered by the at least one motion-detection device, classify the movement of the driver's fingers in a predetermined gesture associated with an instruction on the interface; and
    the mobile device is configured to, based on the instruction associated with the finger gesture, execute a function on the mobile device;
    wherein the driver's fingers' movement is classified by means of binomial and multinomial logistic regressions with which the probability of classification of a predefined gesture is calculated.

2. The system for executing functions on a mobile device according to claim 1, wherein at least one motion-detection device is an image detection device is an image detection device.

3. The system for executing functions on a mobile device according to claim 2, wherein a motion-detection device further comprises an external motion marker system, which facilitates the detection of movement by the image detection device.

4. The system for executing functions on a mobile device according to claim 1, wherein at least one motion-detection device is an image detection device is a hand accessory with sensors.

5. The system for executing functions on a mobile device according to claim 4, wherein the hand accessory is a glove.

6. The system for executing functions on a mobile device according to claim 4, wherein the sensors of the hand accessory are optical flex sensors.

7. The system for executing functions on a mobile device according to claim 1, wherein at least one motion-detection device is an image detection device comprises an electromyographic signal detection device.

8. The system for executing functions on a mobile device according to claim 1, wherein at least one motion-detection device is a hand accessory with sensors and at least another motion-detection device is an image detection device.

9. The system for executing functions on a mobile device according to claim 1, wherein the mobile device is configured to further receive voice commands.

10. The system for executing functions on a mobile device according to claim 9, wherein each voice command corresponds to one and only one of the predetermined gestures.

11. The system for executing functions on a mobile device according to claim 1, wherein the mobile device is configured to further receive haptic commands on the screen.

12. The system for executing functions on a mobile device according to claim 11, wherein each haptic command corresponds to one and only one of the predetermined gestures.

13. The system for executing functions on a mobile device according to claim 1, wherein the functions executed on the mobile device correspond to navigating a graphic arrangement of elements of an interface configured to be used in the head-up display.

14. The system for executing functions on a mobile device according to claim 13, wherein the interface is configured in a decision tree structure to execute mobile application functions.

15. The system for executing functions on a mobile device according to claim 1, wherein the head-up display includes a high-reflectivity combiner and a non-slip holder.

16. The system for executing functions on a mobile device according to claim 1, wherein the head-up display includes an adjustable holder and a combiner to adjust the virtual image.

17. The system for executing functions on a mobile device according to claim 1, wherein the head-up display includes a flexible hose that allows adjusting the position of the head-up display.

18. The system for executing functions on a mobile device according to claim 1, wherein the head-up display includes an adjustable holder that disengages from the head-up display and becomes a protective case for the mobile device.

19. The system for executing functions on a mobile device according to claim 1, wherein the motion-detection device further comprises a wireless communication module to communicate with the mobile device.

20. A method for executing functions on a mobile device based on the gestures of the driver of a vehicle, the method comprising:
　　capturing through a motion-detection device, information on the user's fingers movement, regardless of whether or not the user's hands are on the steering wheel of a vehicle:
　　transmitting the information to a mobile device;
　　determining, based on the information on the movement of the fingers, the probability that the driver has made a gesture corresponding to a predetermined classification;
　　classifying, based on the determined probability, the movement of the driver's fingers in a predetermined gesture, and
　　executing, on the mobile device, a function corresponding to the gesture in which the movement of the driver's fingers was classified:
　　wherein:
　　the mobile device functions are displayed in a virtual image generated through a head-up display implemented by means of the mobile device's screen;
　　wherein the fingers' movement is identified by means of binomial and multinomial logistic regressions.

\* \* \* \* \*